United States Patent
Rantanen et al.

(10) Patent No.: US 10,776,313 B2
(45) Date of Patent: Sep. 15, 2020

(54) CONVERTING SOURCE OBJECTS TO TARGET OBJECTS

(71) Applicant: Tekla Corporation, Espoo (FI)

(72) Inventors: Teemu Rantanen, Helsinki (FI); Pekka Hämäläinen, Espoo (FI); Harri Salmivaara, Kirkkonummi (FI)

(73) Assignee: Tekla Corporation, Espoo (FI)

( * ) Notice: Subject to any disclaimer, the term of this patent is extended or adjusted under 35 U.S.C. 154(b) by 222 days.

(21) Appl. No.: 14/039,574

(22) Filed: Sep. 27, 2013

(65) Prior Publication Data

US 2014/0095550 A1  Apr. 3, 2014

Related U.S. Application Data

(60) Provisional application No. 61/707,187, filed on Sep. 28, 2012.

(30) Foreign Application Priority Data

Sep. 28, 2012  (FI) ...................................... 20126010

(51) Int. Cl.
*G06F 16/11*  (2019.01)
*G06F 16/21*  (2019.01)

(52) U.S. Cl.
CPC .......... *G06F 16/116* (2019.01); *G06F 16/214* (2019.01)

(58) Field of Classification Search
CPC .... G06F 21/55; G06F 9/505; G06F 17/30867; G06F 17/30; G06F 17/30233; G06F 3/061; G06F 8/34; G06F 11/0709; G06F 21/10; G06F 16/9535; G06F 17/211; G06F 8/427; G06F 16/116
See application file for complete search history.

(56) References Cited

U.S. PATENT DOCUMENTS

| | | | |
|---|---|---|---|
| 6,996,589 B1 * | 2/2006 | Jayaram | G06F 16/258 |
| 7,290,003 B1 * | 10/2007 | Tong | |
| 7,548,898 B1 | 6/2009 | Tarenskeen et al. | |
| 8,327,419 B1 * | 12/2012 | Korablev | G06F 21/6218 |
| | | | 707/728 |
| 8,527,544 B1 * | 9/2013 | Colgrove | G06F 3/0608 |
| | | | 707/791 |
| 2003/0120686 A1 * | 6/2003 | Kim | G06F 40/14 |

(Continued)

FOREIGN PATENT DOCUMENTS

| | | |
|---|---|---|
| EP | 1 596 313 A2 | 11/2005 |
| EP | 1 708 099 A1 | 10/2006 |
| EP | 1 990 740 A1 | 11/2008 |

OTHER PUBLICATIONS

Finland Search Report for Application No. 20126010, dated May 27, 2013, 2 pages.

(Continued)

*Primary Examiner* — Mariela Reyes
*Assistant Examiner* — Courtney Harmon
(74) *Attorney, Agent, or Firm* — Kilpatrick Townsend & Stockton LLP

(57) ABSTRACT

Source objects according to a source data model are converted to target objects according to a target data model. A plurality of target data collections are generated, each including uniquely identifiable target objects. A first generated target data collection is merged with a subsequently generated target data collection.

19 Claims, 3 Drawing Sheets

(56) References Cited

U.S. PATENT DOCUMENTS

| | | |
|---|---|---|
| 2004/0139129 A1 | 7/2004 | Okuyama |
| 2004/0143799 A1 | 7/2004 | Hedge et al. |
| 2006/0136398 A1 | 6/2006 | Suomi et al. |
| 2007/0033550 A1 | 2/2007 | Berger et al. |
| 2007/0055655 A1 | 3/2007 | Bernstein et al. |
| 2009/0119395 A1* | 5/2009 | Kodama ............... H04L 67/10 709/223 |
| 2009/0138592 A1* | 5/2009 | Overcash et al. ........... 709/224 |
| 2010/0057759 A1 | 3/2010 | Cotichini et al. |
| 2010/0082816 A1* | 4/2010 | Kharat ..................... G06F 9/54 709/226 |
| 2010/0114841 A1 | 5/2010 | Holenstein et al. |
| 2011/0178966 A1 | 7/2011 | Nikovski |
| 2011/0270844 A1* | 11/2011 | He et al. ...................... 707/745 |
| 2012/0030167 A1 | 2/2012 | Appiah et al. |
| 2012/0041933 A1 | 2/2012 | Driesen |
| 2012/0078913 A1 | 3/2012 | Muni et al. |
| 2012/0131067 A1 | 5/2012 | Smith |
| 2013/0046949 A1* | 2/2013 | Colgrove ............. G06F 3/0608 711/170 |
| 2014/0061294 A1* | 3/2014 | Kempf .................. G06Q 10/08 235/375 |

OTHER PUBLICATIONS

Finland Office Action dated Jun. 3, 2015 for FI Patent Application No. 20126010, 13 pages.

\* cited by examiner

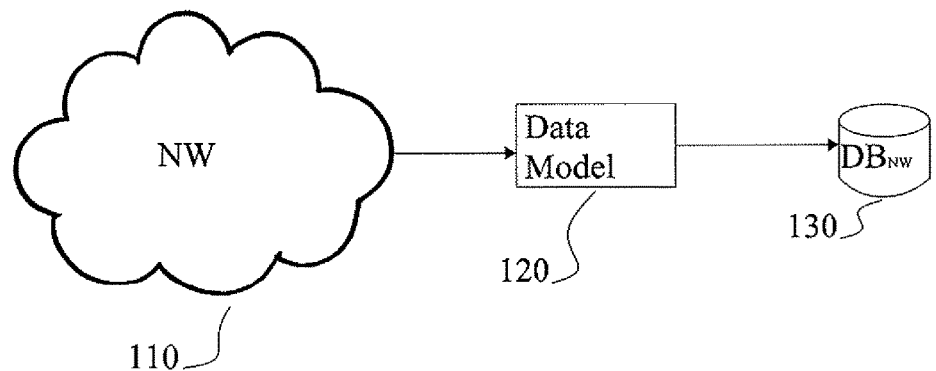
Figure 1a
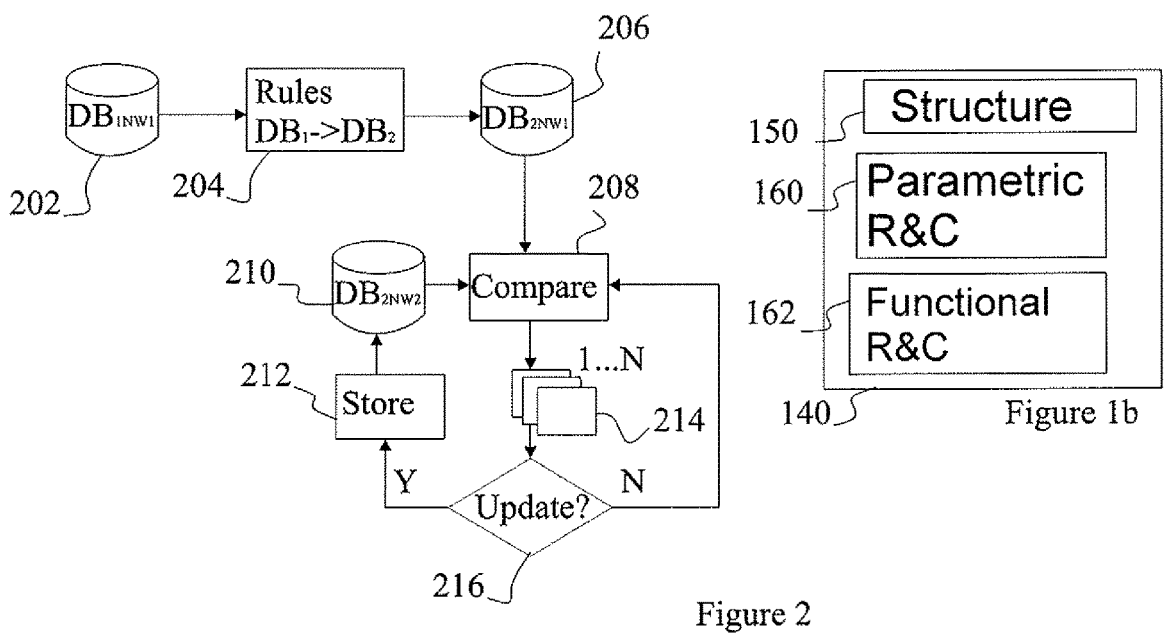
Figure 1b
Figure 2
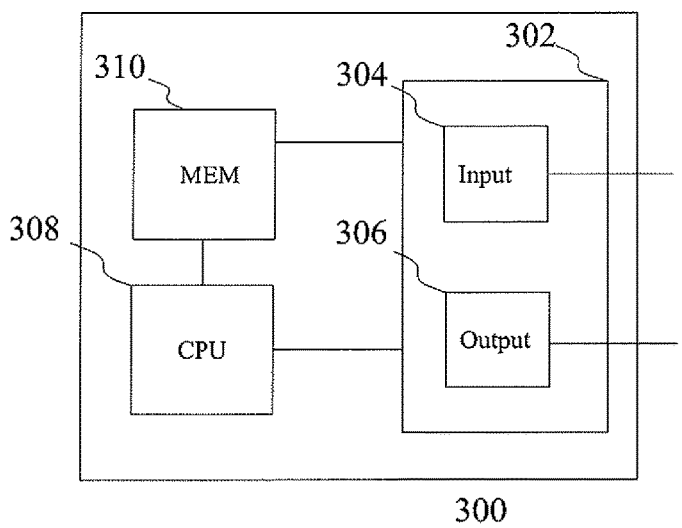
Figure 3

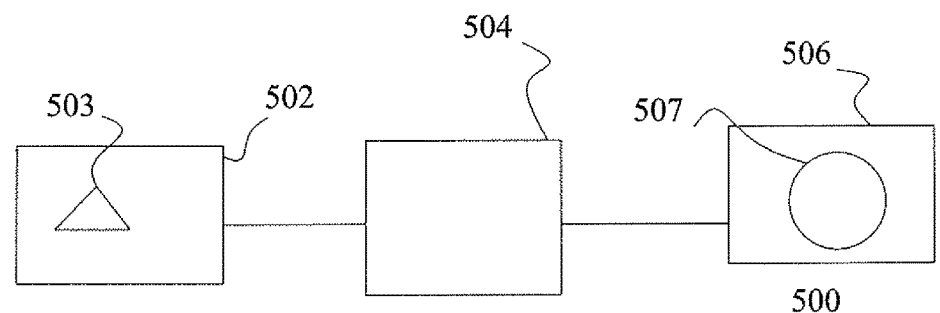
Figure 4
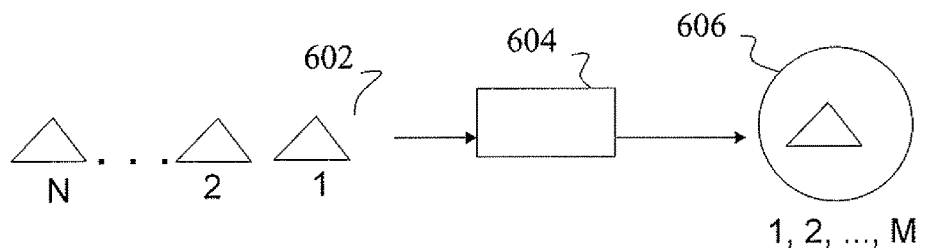
Figure 5
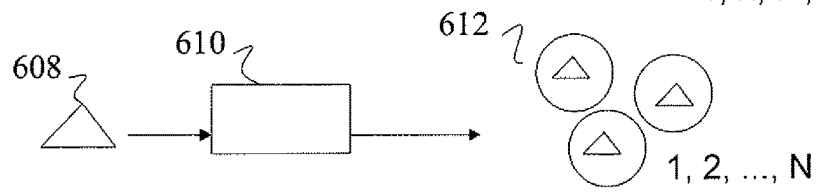
Figure 6a
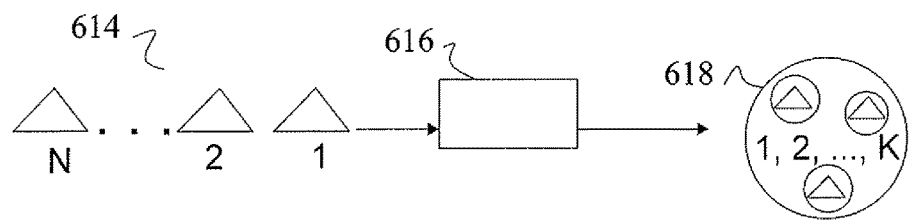
Figure 6b
Figure 6c

CONVERTING SOURCE OBJECTS TO TARGET OBJECTS

RELATED APPLICATIONS

This application claims priority to FI Patent Application No. 20126010, filed Sep. 28, 2012, and to U.S. Provisional Application No. 61/707,187, filed Sep. 28, 2012, both of which are assigned to the applicant of the present application and are incorporated herein by reference in their entirety for all purposes.

FIELD

The present invention relates to converting data objects, and more particularly converting data objects according to one data model to data objects of another data model.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Conventionally data conversion is the conversion of computer data from one format to another. Each computer program handles data in a different manner. Data conversions may be as simple as conversion of a text file from one character encoding system to another; or more complex, such as conversion of office file formats, or conversion of image and audio file formats or even more complex with very large databases. There are many ways in which data is converted within the computer environment. This may be seamless, as in the case of upgrading to a newer version of a computer program. Alternatively, the conversion may require processing by means of a special conversion program. In some cases, a program may recognize several data file formats at the data input stage and then is also capable of storing the output data in a number of different formats. Such a program may be used to convert a file format. If the source format or target format is not recognized, then a third program may be available which permits the conversion to an intermediate format, which can then be reformatted using the first program. If there is not a specific program already available, data formats and data models need to be studied and so enable the mapping of data. A database is an organized collection of data, today typically in digital form. The data is typically organized to model relevant aspects of reality, in a way that supports processes requiring this information. In computer science, a database is a particular way of storing and organizing data on a computer so that it can be used efficiently. Different kinds of databases are suited to different kinds of applications, and some are highly specialized to specific tasks. Databases provide a means to manage huge amounts of data efficiently.

A database management system (DBMS) is a system that allows to build and maintain databases, as well as to utilize their data and retrieve information from it. A DBMS defines the database type it supports, as well as its functionality and operational capabilities. A DBMS provides the internal processes for external applications built on them. The end-users of such a specific application are usually exposed only to that application and do not directly interact with the DBMS. Thus end-users enjoy the effects of the underlying DBMS, but its internals are completely invisible to end-users. Database designers and database administrators interact with the DBMS through dedicated interfaces to build and maintain the applications' databases, and thus need some more knowledge and understanding about how DBMSs operate and about external interfaces and tuning parameters of the DBMSs. A database built with one Database Management System (DBMS) is not transferable to another DBMS. Due to the incompatibility of the DBMSs, a database of one DBMS cannot be run on another DBMS.

DBMSs are found at the heart of most database applications. In some situations it is desirable to convert a database from one database structure to another or from one DBMS to another or even from file system to DBMS. This might happen when moving over from using one product to using another product. The new program may be from a new vendor and then uses very likely a different data model. This kind of situation may include that an existing database or databases contain information that has taken years to gather, or when a large database (LDB) or very large database (VLDB) is involved. The chance that products organize data differently in databases is very probable. The knowledge of years need to be transferred to another product's data model.

Conventionally a conversion between different databases, DBMSs or data models includes designing specifications to define a mapping between the different databases, DBMSs or data models, and maybe writing custom application to handle the conversion. Designing the conversion involves a lot of manual work and is time consuming. There might be just a few specifications available about the databases, DBMSs or data models. When the conversion specifications are ready, the conversion can be performed to obtain data in a desired target format. The actual conversion may be also time consuming depending on the size and structure of the transformed databases or DBMSs and available processing power. The conversion is error prone and so test conversions are carried out before the real one. If there are errors they are corrected and a conversion is carried out again. There might be multiple iterations before a result of a conversion is acceptable.

During a final conversion between a source and a target database, if the source database is changed, the resulting target database is already outdated at completion of the conversion. When the final conversion has started the modifications to the source database are not moving anymore to the target database. It takes time to make conversion specifications and iteratively execute conversions to arrive at an acceptable conversion result. The overall conversion work of large databases may take days, weeks, months or even years to be completed. Also after the final conversion, the target database may need to be checked and confirmed to be correct before taking it into use. Also the checking takes time and during that time the source and target databases cannot be used since the target database is not ready. As the final conversion is very time consuming the final conversion is usually executed only once and small errors in the target database are accepted when testing the data.

BRIEF DESCRIPTION OF THE EMBODIMENTS

An object of the invention is to alleviate at least some of the above disadvantages. The object is achieved by the method, apparatus, system and computer program defined in the independent claims. Further advantageous embodiments of the invention are defined in the dependent claims.

According to another aspect of the invention there is provided a method comprising, converting source objects according to a source data model to target objects according to a target data model, storing with each of the target objects information identifying a source object of the target object, generating a plurality of target data collections, each of which includes uniquely identifiable target objects, and merging a first generated target data collection with a subsequently generated target data collection.

According to another aspect of the invention there is provided an apparatus comprising means for performing steps of a method according to an aspect.

According to another aspect of the invention there is provided an apparatus comprising at least one processor, and at least one memory including computer program code, the at least one memory and the computer program code configured to, with the at least one processor, cause the apparatus at least to perform the steps of a method according to an aspect.

According to another aspect of the invention there is provided a computer program product comprising executable code that when executed, cause execution of functions of a method according to an aspect.

According to another aspect of the invention there is provided a system comprising one or more apparatuses according to an aspect.

According to another aspect there is provided a computer program embodied on a non-transitory computer readable storage medium, the computer program being configured to control a processor to perform a method according to an aspect.

Although the various aspects, embodiments and features of the invention are recited independently, it should be appreciated that all combinations of the various aspects, embodiments and features of the invention are possible and within the scope of the present invention as claimed.

Some aspects provide improvements which allow existing data stored in a database to be migrated to another database using a different data model for organizing data, while allowing management of data by both of the databases. In this way databases using different data models can co-exist for managing data. By the co-existing databases decommissioning of an existing database may be delayed, which improves data security of database conversions.

Some aspects provide improvements comprising reducing or even avoiding service breaks in the use of databases during conversion of data between the databases. Subsequent conversions of source objects to target objects provide updating of changes to the source objects after their conversion to target objects. On the other hand, subsequent conversions provides correction of an error in an earlier conversion in the next of following conversions and converting a source database into a target objects in several parts.

BRIEF DESCRIPTION OF THE DRAWINGS

In the following the invention will be described in greater detail by means of preferred embodiments with reference to the accompanying drawings, in which FIG. 1a illustrates generation of a database from a network on the basis of a data model;

FIG. 1b illustrates contents of a data model for generating a database according to an embodiment;

FIG. 2 illustrates generation of target objects according to a target data model from source objects according to a source data model, according to an embodiment;

FIG. 3 illustrates an apparatus according to an embodiment;

FIG. 4 illustrates data stored in a data collection, according to an embodiment;

FIG. 5 illustrates a system for implementing an embodiment;

FIGS. 6a to 6c illustrate object identification in conversion according to embodiments;

DETAILED DESCRIPTION OF THE EMBODIMENTS

Figures 7A, 7B:
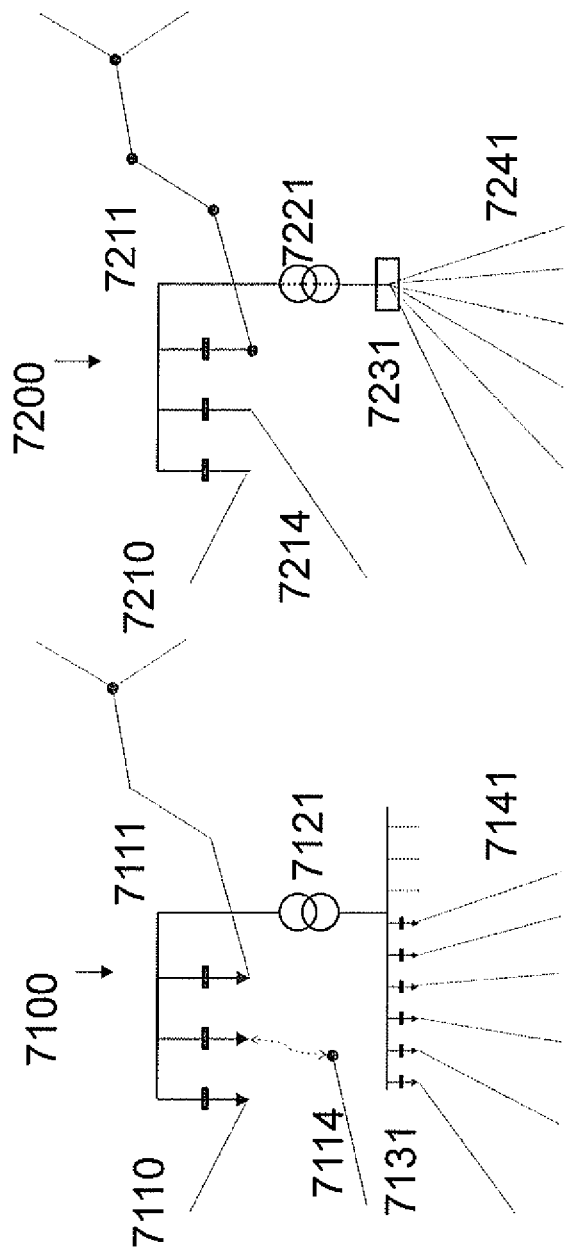
FIGS. 7a and 7b are schematic illustrations of electrical grid diagrams according to different data models.

In different embodiments a unit of data organized according to a data model will be referred to as an object. A data collection may include one or more objects.

FIG. 4 illustrates data stored in a data collection, according to an embodiment. A data collection may include data organized into one, two, three, or more structures of data, e.g. tables 410, 420. The data stored in the data collection is organized in each table and between the tables, when more than one table are included in the data collection. The structure of data, i.e. in FIG. 4 the tables may be defined by a data model. In one example the collection of data in the tables comprises a relational database.

A data model may define a structure of data that organizes data into two-dimensional arrays known as tables 410, 420. As conventional with objects stored in each table of a relational database, each object 404, 424 is uniquely identifiable within the objects stored in the same table by a key. The key may be a table key comprising a single, or a set of multiple, attribute(s) that uniquely identify the object within the table. Typically, the tables consist of a heading and a set of zero or more objects in arbitrary order. The heading 402, 422 is an unordered set of zero or more attributes, or columns of the table. Each object comprises a set of unique attributes mapped to the object. Data can be associated across multiple tables with a key, e.g. a foreign key. The key may be a single, or a set of multiple, attribute(s) that uniquely identifies the object across multiple tables.

In an embodiment the data of table 410 represents an entity related to one or more smaller entities represented in table 420. The entities may be physical entities or logical representations of physical entities. Examples of the entities include but are not limited to network nodes of an electric grid, entities of a municipal data application, water supply system or a communications network. A conventional electric grid may comprise entities for example, but not limited to a transformer station and a cable. A water supply system may comprise entities for example but not limited to a water supply system, valves and pipes. A communications network may comprise entities for example but limited to base stations, controllers, communications lines and switches.

In the example of FIG. 4, the table 410, 420 stores data in a plurality of rows 404, 424 each of which corresponds to an entity. Each row may be referred to as an object. The rows may include one or more attributes arranged in columns and including information related to the object. The attributes may be used to define the object. Each object may be uniquely identified in its table 410, 420 by one or more attributes 406, 426, forming a table key.

In the example of FIG. 4, the table 410 stores 1 to n objects representing transformers of an electric grid. The transformers are identified by the first attribute, attr_1, of the table 410 defining table keys of the transformer objects: transformer_id_1, transformer_id_2, . . . , transformer_id_n. Each transformer object is stored with one or more attributes, in this example 1 to n attributes: attr_1, attr_2, . . . , attr_n. Table 2 stores 1 to 3*n objects representing transformers for each phase of a three-phase electric current. Accordingly, the transformers identified in tables 410 and 420 are a specific example related to representing a three-phase transformer identified in table 410 by related separate transformers for each phase in table 420. Accordingly, it should be appreciated that the number of related objects and kind of related objects may be different from the example of FIG. 4 depending on the implementation. In table 420 each object represents a transformer of a single phase of a three-phase electric current. For the first phase the table includes transformers identified by the first attribute, attr_1: transformer_id_i1, transformer_id_i1, and transformer_id_i1. For the second phase the table includes transformers identified by the first attribute, attr 1: transformer_id_i2, transformer_id_i2, and transformer_id_i2. For the third phase the table includes transformers identified by the first attribute, attr_1: transformer_id_i3, transformer_id_i3, and transformer_id_i3. The parameter i in the attributes may be defined as i=1, 2, 3, . . . , n.

In FIG. 4, the data in tables is 410 and 420 is structured by the tables 410 and 420 storing objects of related logical entities of transformers. The table 410 stores objects of three-phase transformers and the table 420 stored objects of one-phase transformers. The related objects of the tables can be determined on the basis of a data model defining implementations of physical three-phase transformers, represented by objects in table 410, by separate one-phase transformers for each phase, the one-phase transformers being represented by objects in table 420. The relationship between the transformer objects of table 410 and 420 may be defined by the attribute attr_2 of table 420 identifying the related transformer in the table 410 for each transformer object uniquely identified by the first attribute attr_1 in table 420. In this way the objects related to other entities may be determined uniquely in each table by keys that identify each object uniquely within the objects of the same table, and also between tables by their table key and one or more attributes uniquely identifying an object of another table. It should be appreciated that the example of FIG. 4 may be applied also to other structures of data between objects stored in different tables.

In the tables 410 and 420 the values of attributes are illustrated as a function val( ) applied to each attribute. The value may be subject to one or more constraints on the basis of a data model applied to storing data, e.g. the data model of FIG. 1b.

While in the example of FIG. 4 a three-phase transformer is represented as three separate one-phase transformers, the actual implementation of physical devices may be according to either one representations of the three-phase transformers illustrated by tables 410 or 420, or the actual implementation may take yet another form. Thereby, the described embodiments may arrange logical entities in the tables, as in FIG. 4, where the logical entities and their connections are modelled. Such arrangements of logical entities may be used is several tasks in the area of engineering including but not limited to planning, maintenance and deployment or networks.

FIG. 1a illustrates generation of a data collection 130 from a network 110 on the basis of a data model 120. The data collection may be for example the data collection 410, 420 of FIG. 4. The network may be a collection of physical entities that are functionally interconnected. Examples of the network include an electrical grid, a water distribution system, a sewer system and a communications network, without limiting thereto.

In the following description the embodiments are described using the example of an electrical grid as the network. According to the process of generating a data collection illustrated in FIG. 1a, the data collection is generated from the electrical grid according to a data model applied to the electrical grid. The electrical grid may comprise several kinds of devices including but not limited to a transformer, a cable and a connector. The grid is formed by interconnecting the devices into a functional entity, the electrical grid. The data model applied to the electric grid defines structure of data between logical entities representing the devices of the network.

The generating of the data collection may comprise projecting the devices of the electric grid into a logical representation including logical entities on the basis of the data model. The logical representation of data is organized according to the data model and forms a data collection. The logical entities obtained by the projection may be stored into a memory of a memory device to form a database of the electric grid. FIG. 4 illustrates one example of projection of electric grid devices, where transformers are projected into a data collection.

FIG. 1b illustrates a data model 140 for generating a data collection according to an embodiment. The data model comprises information defining structure of data 150 between logical entities stored in the database, parametric relations and constraints, 160 and functional relations and constraints 162. The data model defines how data is organized in a data collection. The data may be organized into a relational database as described in FIG. 4, for example. By employing the data model in generation and/or conversion of objects, physical entities of an electric grid 110 may be represented as logical entities and managed by using different data models, e.g. in different applications. The logical entities may be objects of a relational database 130.

The structure of data 150 may comprise definitions of one or more logical entities that are stored in the data collection and represent physical devices. The logical entity definition is a template for generating one or more corresponding logical entities in the database. The physical devices may be e.g. devices of various networks not limited to an electric grid, a water supply system, a communications network, a sewer system. The devices of the electric grid may include: transformers, switches, cables, for example. The logical entities may be objects of a data collection illustrated in FIG. 4. The structure of data between the objects of the data collection are defined by identifying each object by their table keys and related objects by one or more attributes which define their relationship uniquely. In one example a physical implementation of devices may be used to determine structure of data. In FIG. 4, three-phase transformers of table 410 may be implemented as separate one-phase transformers for each phase. Thereby, the data of a three-phase transformer may be organized in a table 410 including objects representing three-phase transformers and to another table 420 with objects representing one-phase transformers implementing the three-phase transformer stored in table 410. The parametric relations and constraints 160 and functional relations and constraints 162 may comprise information about complex rules and specifications associated with the logical entities stored in the DBMS.

The parametric relations and constraints may include information on dependencies between the logical entities. In one example of the data collection comprising a relational database, the parametric relations and constraints may include information about dependencies between objects and/or attributes of different tables, e.g. tables 410 and 420 of FIG. 4. Accordingly, in the example of FIG. 4 the data of transformers is structured in two tables representing three-phase transformers and one-phase transformers. The parametric relations and constraints may define related objects between the tables 410 and 420 by the objects of one-phase transformers implementing a three-phase transformer object stored in table 410. In this example the constraint on the parametric relations may comprise a maximum number of three one-phase transformers per each three-phase transformer.

In the context of relational databases, the information about dependencies may comprise a foreign key that is a referential constraint between tables in the context of relational databases. The foreign key can be used to cross-reference tables. In the above example of FIG. 4, the foreign key may comprise the attr_2 of table 420.

In another example, the parametric relations and constraints 160 may comprise indexing information or referencing information. In an embodiment, where a data collection comprises a relational database comprising one or more tables, the indexing information may comprise one or more indexes that include a copy of one part of data stored in the relational database, e.g. one or more attributes of one or more objects stored in the tables.

The functional relations and constraints include information that is not stored in a data collection, but is however needed for organizing logical entities in the data collection. The functional relations and constraints define functional features of the logical entities stored in the data collection, e.g. a relational database.

The functional relations and constraints may comprise information about interoperability of the logical entities, for example. In a typical example functional relations and constraints are implemented in application code. In one example, the information about interoperability of the logical entities may comprise e.g. information defining connectable logical entities and requirements for connecting two physical devices represented by the logical entities together. The connectable logical entities may be defined e.g. by requirements regarding attributes of the logical entities. Examples of the requirements may include requirements regarding voltage levels and/or location information, for example.

In one example, the functional relations and constraints comprise information about an acceptable value of an attribute of a logical entity. the attribute may comprise e.g. a location, and the a logical entity may represent a cable or a section of a cable. Accordingly, the attribute may define a location of one end of the cable, for example. An acceptable location value may be defined for example as a distance from a connector receiving the cable end. The location of the connector may be stored in a location value of an attribute of logical entity representing a switch of a transformer for example. When the distance of the cable end to the connector is too long the distance does not conform to the functional relations and constraints and such object cannot be generated according to the data model employing the functional relations and constraints.

In another example, the functional relations and constraints comprise information about an acceptable voltage to be connected to a cable. For example, the functional relations and constraints may include a definition that an acceptable value for an attribute that defines voltage of the logical entity representing a cable is 230V. Then the logical entity representing the cable cannot be connected to a logical entity having 1200V operational voltage, since this would not conform to the functional relations and constraints of the data model.

When the data model 140 is used for organizing data in a data collection, logical entities e.g. logical entities representing switches, transformers and cables may each be organized in their own structures, e.g. tables within the data collection. By way of the data model comprising parametric relations and constraints 160 and functional relations and constraints 162, data is organized in the data collection without having to store further data in the data collection itself.

In an embodiment a data model 140 comprises an object definition having a constraint regarding a source of data. In one example the object definition defines a template for generating an object representing a transformer. The object definition may be defined on the basis of the data model. Objects representing the same physical devices, e.g. transformers, may be generated using the same object definition. The object definition may comprise e.g. attributes of the object as illustrated in tables 410 and 420 of FIG. 4. Using the template, physical devices of an electric grid, e.g. transformers, may be generated to form an organized data collection as that illustrated in FIG. 4. The constraint regarding the source of data may define that objects generated using the object definition, may only receive data from a specific source. The constraint need not to apply to all attributes of the object, but only a part of the attributes. The restriction may define that an acceptable source of data is limited to one or more objects conforming to a specific data model, to an application and/or to a DBMS. This facilitates use of multiple sources of data to objects and/or to attributes. Data from one data source should not overwrite data from another data source.

FIG. 2 illustrates generation 204 of target objects 206 according to a target data model from source objects 202 according to a source data model, according to an embodiment. The source and target data models may have different data models, whereby conversion rules may be specified to convert data between the two models. Conversion rules may include parametric and functional rules to convert source data to target data, e.g. direct mapping between objects, and possibly conversion rules include application code. FIG. 4 illustrates examples of objects 404, 424 according to a data model.

In an embodiment a target object obtained by conversion of one or more source objects is stored comprising information identifying a source object of the target object. This information may include an identifier of the source object. Examples of the identifier include one or more attributes and the examples described with FIG. 4 of identifying objects in tables.

The conversion rules 204 may define a direct mapping between objects of the source and target data model, mapping of a single source object to more than one, e.g. 2, 3, 4, or any number of target objects, mapping of a plurality of source objects to 1, 2, 3, 4, or any number of target objects and/or generating new target objects without any corresponding source object. Examples of the conversion rules and object identification are further illustrated in FIG. 6 and its associated description.

The source objects may be of any source data structure, e.g. a text file, an Extended Markup Language (XML) file or a data collection e.g. a relational database. The source objects can be generated according to the process of FIG. 1a.

The target objects may comprise objects of a data collection organized according to a data model. The data model of the target objects may comprise the data model illustrated in FIG. 1b, for example.

The target objects are obtained through a conversion of the source objects according to the conversion rules. The source objects provide the source data to the conversion rules that generate target objects on the basis of the source data and according to the data model of the target objects. The target objects may be stored in a relational database. The target objects may be stored according to the data model explained above with FIG. 1b. The source objects can be generated according to the process of FIG. 1a.

In an embodiment, the target objects 206 may be merged with another set of target objects 210. In merging, changes between the data collections may be updated to one of the data collections 206, 210. In the following merging will be described, when target objects 206 obtained through the conversion are used to update target objects 210 obtained by an earlier conversion of source objects to target objects.

In 208 the target objects 206 may be compared with another set of target objects 210. The other set of target objects may have been generated by an earlier conversion 204 of source objects to target objects. Then the comparison in 208 establishes a difference between the previous target objects 210 and the new target objects 206. The conversions 204 may be performed at fixed time intervals, e.g. at the intervals of days, weeks, months or years, whereby target objects obtained via earlier conversions may be compared with the target objects obtained via a subsequent conversion.

The comparison may comprise determining corresponding objects between the earlier generated data collection and the subsequently generated data collection. The correspondence may be determined on the basis of the new target objects and the earlier converted target objects storing information indicating the same source object. The correspondence may be, also or instead, determined on the basis of one or more common attributes between the previously converted target objects.

In an embodiment, a correspondence between the generated target objects of a first and a subsequently generated target data collection may be determined on the basis of one or more common attributes between the target objects.

In an embodiment, a correspondence between objects of subsequently generated target data or subsequently generated data collections may be indicated by one or more or a combination of items from a group comprising: an identifier of a uniquely identifiable source object, one or more attributes uniquely identifying correspondence of an object of an earlier generated target data collection and an object of a subsequently generated target data collection, and an indirect reference to a uniquely identifiable source object via one or more subsequently generated target objects.

In an embodiment, a target object may be specific to the target data model and without a corresponding source object, whereby corresponding objects between target data collections may be determined by one or more common attributes between the objects. Examples of the common attributes comprise a location attribute, that uniquely identify correspondence of the object of the first generated target data collection as the object of the subsequently generated target data collection.

In an embodiment, corresponding objects may be determined on the basis of a comparison value calculated over one or more attributes of a set of source objects and a set of target objects. The sets may include different numbers of objects from a single object to any number of objects. The comparison value may comprise one or more from a group comprising: a geometric value, an electrical value and a correlation value.

A geometric value may in one example comprise a value describing a geometric shape of a set of objects. Examples of the geometric value may comprise one or more of a surface area, a dimension, a manufacturing number or a specification number. Even a manufacturing number that identifies one or a group of physical entities e.g. switches, cables, etc. may be used as geometric values, since the manufacturing number defines properties including the shape of a manufactured device. Similar to the manufacturing number, a specification number identifies a specification followed by a physical entity represented by a set of objects, whereby the shape of the physical entity may be defined at least partly by the specification.

An electrical value may in one example comprise a sum of output voltages, electrical currents and/or an impedance of a physical entity represented by a set of objects.

A correlation value may comprise a value indicating similarity between a set of source and a set of target objects.

In an embodiment a plurality of conversions from source objects to target objects are executed. In the conversions target objects resulting from a single conversion are assigned temporary identifiers. The temporary identifiers may be assigned in a sequential manner, whereby target objects of subsequent conversions can have different temporary identifiers. It may not be necessary to assign temporary identifiers to first target objects converted, since before the first conversion there are no target objects resulting from the source objects and thereby differentiation between target objects generated through conversion may not be needed for the first conversion result. Accordingly, the temporary identifiers may be assigned to each object generated subsequent to the first conversion by the steps 202 to 206. However, it should be appreciated that also the first conversion may include assigning the temporary identifiers, for example to meet requirements of the target data model regarding identification of objects.

In one example the temporary identifiers are assigned to each object resulting from the conversion 204. Each temporary identifier identifies the object it is assigned to. The temporary identifier may uniquely identify the generated object within all the generated objects or a subset of the generated objects, e.g. within a table. The temporary identifier facilitates separating the earlier and a subsequently generated target object from each other although referring to the same source object or having one or more common attributes that indicate their correspondence. In one example the correspondence of target objects may be indicated by both of the objects including the same key that uniquely identifies the objects in a data collection. Such a key may comprise a table key as described with FIG. 4. In an embodiment, earlier generated target objects 210 form a master data collection. The master data collection may be used by a DBMS and other software while the new converted target objects 206 are used in updating the master data collection. The master data collection may be defined as the result of a first or previous conversion 204 of source objects to target objects, through the flow chart steps 202 to 206.

In 214 the results of the comparison may be obtained. The result may indicate one or more differences between the new target objects and the earlier generated target objects. The objects may be uniquely identified by at least one from a group comprising: 1) one or more attributes identifying corresponding source object, 2) one or more attributes identifying correspondence of the objects of the earlier generated target object and the new generated target object 3) one or more attributes indirectly identifying corresponding source object or correspondence of the objects of the earlier generated target object and the new generated target object. In one example a unique key value of the same source object used for converting the earlier and the new target objects may be used for identifying the corresponding earlier and new target objects. The unique key value of a source object may comprise e.g. a key value of a table of a relational database, where the key identifies the source object in the table. In another example, one or more attributes of the earlier and the new converted target objects uniquely identify the corresponding objects. Such attributes may comprise a location attribute defining the location of the object and/or a part of the object. The differences between new target objects and earlier generated target objects may include differences in values of all or a part of the attributes of the objects and/or differences in objects, e.g. one or more objects not being present in the earlier target objects.

In an embodiment a target object is specific to the target data model and without a corresponding source object, and corresponding objects between data collections are determined by one or more common attributes, for example a location attribute, which uniquely identify correspondence of the object of the first data collection as the object of the subsequent data collection.

In 216 it is determined whether the earlier target objects 210 should be updated. This may be performed on the basis of the comparison results 214. When the results of the comparison indicate new or deleted target objects or changes in attributes between the new target objects and the earlier target objects, the earlier target objects 210 may be updated, and the process proceeds to 212. Otherwise the earlier target objects are not updated and the process may continue to compare next converted target objects with earlier target objects in 208.

In 212 data from the new target objects is used for updating the earlier target objects from the corresponding objects of a subsequently generated data collection. The results of the comparison 208 are used to store data to the earlier target objects and/or add one or more target objects. The stored data may comprise storing the one or more attributes and/or objects of the new target objects determined to be different from the earlier generated target objects in 214. When temporary identifiers are used to identify earlier target objects and new target objects, the temporary identifier of the earlier target objects is preferably maintained when it is updated.

In one embodiment some existing objects in 210 may be used as source objects in addition to source objects from 202 when converting source objects to target objects 206 using conversion rules 204. This is described in FIG. 6c, for example.

In an embodiment, target objects are converted 204 from source objects according to a data model having a constraint regarding a source of data. Then the updating 212 may comprise determining whether the objects of the subsequently converted target objects 206 meet the constraint regarding the source of data of the earlier converted target objects 210. The constraint may involve a constraint set to an object, an attribute of an object, a group of objects or a group of attributes of an object.

In one example the constraint may comprise an attribute of an object. Then, the constraint may be implemented as a boolean value of the attribute, for example. A Boolean value "TRUE" may indicate that the object may be updated by data from subsequently converted target objects and "FALSE" value may indicate that the object cannot be updated by data from subsequently converted target objects.

In another example the constraint may be set for updating one or more attributes of an earlier converted target object by data from subsequently converted target objects. The implementation may involve that the constraint stored as an attribute of an object defines a constraint regarding one or more other attributes of the object. Then the attribute that sets the constraint may constrain the updating of attributes of the same object that precede or follow the attribute that sets the constraint.

In an embodiment a constraint regarding a source of data defines an allowed source of data comprising one or more from a group comprising: a uniquely identifiable source object, a uniquely identifiable target object of a subsequently generated target data collection, a system managing a target data collection. In this way only data from an allowed source may be used for updating existing target objects, e.g. target objects of a master data collection.

In an embodiment an object definition comprises at least two sets of attributes having different constraints regarding sources of data. The attributes of an earlier converted target object generated using the object definition are only stored data from a corresponding subsequently converted object, when the constraint of the set of attributes is met. Accordingly, the earlier converted target object may have a first set of attributes with one, two, three or any number of attributes and a second set of attributes with one, two, three or any number of attributes. The first set of attributes may be constraint such that it may not be updated by data from subsequently converted target objects. The second set of attributes may have a constraint allowing them to be updated by data from subsequently converted target objects. Then, only the second set of attributes may be updated with data from attributes of a corresponding object in a subsequently converted target object.

It should be appreciated that a constraint regarding a source of data may be included as an attribute of an object or defined in parametric relations and constraints 160 and/or functional relations and constraints 162 included in the data model illustrated in FIG. 1b. In this way a network and/or devices of the network represented by the source objects may be managed by another network management system, and e.g. using another DBMS, than a network management system and/or DBMS operating on the target objects according to a different data model than the source objects. In this way aspects of the network such as the network being formed of devices from several device manufacturers, may be employed to correctly update target objects with data from source objects.

In an embodiment a target object may be provided with a first view and a second view. The views may be generated on the basis of a constraint regarding a source of data to be stored to an object and/or an attribute of an object. Then a view may be generated on the basis of the constraint, including only objects and attributes of the objects that meet or do not meet the constraint. In this way the storing of data from subsequently converted target objects to an earlier converted target object may be facilitated. Also management software, including a DBMS or a network management software accessing the target objects via the DBMS, may be provided only the part of the target objects that can be updated or cannot be updated by the target objects obtained by subsequent conversions of source objects.

In an embodiment a data collection may comprise an organized collection of data including but not limited to a database, e.g. a relational database. The database may be managed by a DBMS. A constraint regarding a source of data may define a database management system as an allowed a source of data.

An embodiment provides conversion of source objects to target objects, when the source and target objects are managed by database management systems that use different data models. The target objects may be generated according to an object definition comprising a constraint regarding a source of data. The constraint may allow one part of the target objects to be updated by data from source objects converted to target objects and another part to be updated by the database management system managing the target objects. In one example the target objects may comprise objects and attributes not, directly or indirectly, having a corresponding source object, whereby such objects are managed only by the DBMS of the target objects. In this way a network managed by different management software and different DBMSs may be kept updated even when the different software and DBMSs are used simultaneously.

In an embodiment a collection of data objects may be organized into a relational database accessible by a database management system comprising one from a group comprising: Oracle, MySQL or MS Access, for example.

FIG. 3 illustrates an apparatus 300 according to an embodiment. FIG. 3 is a block diagram of the apparatus 300. Although the apparatus has been depicted as one entity, different modules and memory may be implemented in one or more physical or logical entities. The apparatus may be a terminal suitable for operating as a termination point for telecommunication sessions. Examples of the apparatus include but are not limited to UE, a mobile phone, a communicator, a PDA, an application server or a computer.

The apparatus 300 comprises an interfacing unit 302, a central processing unit (CPU) 308 and a memory 310 that are all electrically interconnected. The interfacing unit comprises an input 304 and an output unit 306 that provide, respectively, the input and output interfaces to the apparatus. The input and output units may be configured or arranged to send and receive data, objects, attributes, signalling, signalling messages and/or transmissions according to one or more protocols according to communications standards and/or proprietary communications systems including but not limited to: ASUS Media Bus, ISA (Industry Standard Architecture), Extended ISA, NuBusor IEEE 1196, PCI (Peripheral Component Interface), Asynchronous Transfer mode (ATM), Ethernet, IEEE 802.11 Wireless Local Area Network, Global system For Mobile Communications (GSM), 3GPP LTE ($3^{rd}$ Generation Partnership project Long term Evolution) and any other suitable standard/non-standard wireless communication means. The memory may comprise one or more applications that are executable by the CPU.

The CPU may comprise a set of registers, an arithmetic logic unit, and a control unit. The control unit is controlled by a sequence of program instructions transferred to the CPU from the memory. The control unit may contain a number of microinstructions for basic operations. The implementation of micro-instructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions. The memory may be a volatile or a non-volatile memory, for example EEPROM, ROM, PROM, RAM, DRAM, SRAM, firmware, programmable logic, etc.

An embodiment provides a computer program embodied on a distribution medium, comprising program instructions which, when loaded into an electronic apparatus, cause the CPU to perform according to an embodiment of the present invention.

The computer program may be in source code form, object code form, or in some intermediate form, and it may be stored in some sort of a carrier, which may be any entity or device capable of carrying the program. Such carriers include a record medium, computer memory, read-only memory, electrical carrier signal, telecommunications signal, and software distribution package, for example. Depending on the processing power needed, the computer program may be executed on a single electronic digital computer or it may be distributed amongst a number of computers.

The apparatus 300 may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus 300, necessary processing capacity, production costs, and production volumes, for example.

In an embodiment the input unit may provide circuitry for obtaining data, objects, attributes, signalling, signalling messages and/or transmissions to the apparatus. The obtaining may comprise receiving communications signals from a communications interface, for example.

In an embodiment the output unit may provide circuitry for transmitting data, objects, attributes, signalling, signalling messages and/or transmissions from the apparatus. The transmitting may comprise transmitting communications signals on a communications interface, for example.

FIG. 5 illustrates a system 500 for implementing an embodiment. An entity 504 for converting source objects according to a source data model 503 to target objects according to a target data model 507 is connected to an entity 502 that stores the source objects. The entity for converting source objects to target objects is further connected to an entity that receives the target objects. The entity 504 converts the source objects to target objects according to conversion rules. FIG. 1b provides an example of a data model that the different data models of the source and target objects follow. The conversion may follow the work-flow illustrated in FIG. 2. In one example the entities 502 and 506 may be implemented as memory devices, which may be separate devices or a single device, and the entity 504 may be implemented for example as the apparatus of FIG. 3. In another example all the entities of the system 500 are implemented in a single apparatus, e.g. the apparatus of FIG. 3, where all the source and target objects may be stored in internal memory of the apparatus and accessed by the CPU to be processed according to instructions stored in the memory.

In one example of the system 500 of FIG. 5, at least the steps of 202 to 206 of FIG. 2 may be performed by the system 500. The data collection 202 may correspond to entity 502 and the entity 506 may execute the conversion described above with step 204. Lastly the entity 506 of FIG. 5 may correspond to the data collection 206. The further steps of FIG. 2 may be performed by the entity 506 or the steps may be performed by one or more other entities (not shown). It should be appreciated that the configuration of FIG. 5 is an architectural view of the system and the actual implementation may be different. The connections between entities are logical connections and the actual physical connections may be different. Examples of different connections that may be applied in apparatuses implementing the embodiments are provided in the description with the apparatus of FIG. 3. In yet another example the entities of the system 500 may be implemented in a distributed computing system by employing cloud computing.

FIGS. 6a to 6c illustrate object identification in conversions according to embodiments. In FIGS. 6a and 6b, target objects include direct references to source objects used in generating them. In FIG. 6c target objects include indirect references to source objects used in generating them. A direct reference comprises a property of the source object, whereas an indirect reference comprises a reference that does not point directly to the source objects but indirectly via another data, e.g. one or more other target objects. A direct reference may comprise an identifier of one or more uniquely identifiable source objects and/or one or more attributes uniquely identifying correspondence of an object of an earlier generated target data collection and an object of a subsequently generated data collection. An indirect reference may comprises a reference to one or more target objects that refer directly to one or more source objects by a direct reference.

In FIG. 6a conversion rule is illustrated, where one or more 1, 2, . . . , N source objects 602 according to a source data model is converted 604 to one or more target objects 1, 2, . . . , M 606 according to a target data model. A single target object 606 generated according to FIG. 6a, may have a corresponding source object 1, 2, . . . , N. This source object may be identified by the generated target object storing an identifier of the source object. In one example the source object is identified by storing an identifier of the source object with the target object. The identifier may comprise key, for example a table key attr_2 in table 420 identifying a source object in another table 410 of FIG. 4. When multiple source objects 1, 2, . . . , N are converted to a target object, the identifier of a certain source object may be used as the identifier in the target object. When a plurality of target objects N are converted into a plurality of target objects M, each of the target objects may be stored an identifier identifying the group of source objects N. Also in each of the target objects may be stored an identifier identifying certain source object.

In FIG. 6b a conversion rule is illustrated, where a source object 608 according to a source data model is converted 610 to a plurality of target objects 612 1, 2, . . . N according to target data model. The source object for the target objects may be identified by the target objects storing an identifier of the source object. The identifier may comprise key, for example a table key attr_2 in table 420 of FIG. 4. When multiple target objects are converted from a source object, additional attributes may be used with source identifier to uniquely identify target objects.

FIG. 6c illustrates a conversion rule, where a target object 618 according to a target data model is generated 616 without a corresponding source object 614 according to a source data model. The generated target object may be indirectly related to one or more source objects via other target objects 1, 2, . . . , K generated on the basis of one or more source objects 1, 2, . . . N. The other target objects may be generated according to the conversion rules illustrated in FIGS. 6a and 6b. Accordingly, the other target objects may be directly related to the one or more source objects. It should be appreciated that the generated target object may be related to one or more source objects by one, two, three, or any number of nested indirect references to source objects. In a nested referencing a generated target object includes a reference to one or more other target objects which again may refer to one or more other target objects until at least one of the referenced target objects includes a direct reference to one or more source objects. The direct reference may comprise for example the at least one target objects including an identification of the one or more source objects.

The target object 618 generated without a corresponding source object may be identified by the other target objects 1, 2, . . . , K. In one example, a target object may not have a corresponding source object, when an object definition used in the target data model does not exist in the source data model. However, when source objects according to the source data model are converted to target objects according to the target data model, the conversion rules may require generating one or more objects of the object definition not supported by the source data model. The unique identification may be implemented by the target object without a corresponding source object storing an identifier of the one or more source or other target objects and/or the target object comprising one or more attributes uniquely identifying the corresponding one or more earlier generated target objects.

It should be appreciated that in the above conversion rules in FIGS. 6a to 6c also a combination of two or more attributes of a target object can be used to uniquely identify a source object or a related target object for a target object generated by the conversion rules.

FIGS. 7a and 7b are illustrations of electrical grid diagrams 7100, 7200 according to different data models. An embodiment will be now explained with reference to the diagram 7100 providing source objects that are converted to target objects illustrated by the diagram 7200. The process of converting the source objects to target objects may follow the process described with FIG. 2 for example. The conversions may be performed by the apparatus of FIG. 3. FIG. 5 illustrates a system, where the conversions may be performed.

In the electrical grid diagram 7100, a transformer 7121 connects to voltage supply lines 7110, 7111 and 7114 and a low voltage distribution grid illustrated by object 7131 and 7141. In one example the transformer connects to a medium voltage distribution grid to transform electricity to a low voltage grid. As is conventional medium voltage distribution grid operates on a higher voltage, e.g. 1-35 kV than the low voltage assembly station, e.g. 230/400 V. The medium voltage distribution grid transfer electricity form a high voltage network to the transformer that feeds electricity to the low voltage grid that connects to households. One voltage supply line 7114 is logically connected to the transformer as illustrated by a dashed line between the voltage supply line and the transformer input. Other voltage supply lines 7110, 7111 connect directly to the transformer. The low voltage output of the transformer connects to a low voltage busbar providing a plurality of low voltage feeders 7141 supplying electricity towards households.

The above-explained objects may be converted to target objects employing the conversion rules illustrated in FIGS. 6a to 6c. The conversion rules employ the target data model, e.g. the target data model according to FIG. 1b. Since the target data model is different from the source data model, different conversion rules may be applied to different source objects.

The electrical grid diagram 7200 illustrates an example of target objects obtained by converting the source objects of the diagram 7100 of an electric grid using the target data model. The result of the conversion may vary depending on the data model used in the conversion. Next conversion rules applied to the objects of the diagram 7100 are explained.

The voltage supply line 7110 is converted using the conversion rule of FIG. 6a, where N=1. Thereby the source object of cable 7110 is directly converted to a single target object of 7210, representing a voltage supply line according to the target data model. The single target object may include information identifying the source object 7110.

The voltage supply line 7111 is converted using the conversion rule of FIG. 6b, where N=3. Thereby, a single source object representing a cable is converted to three objects that each may include information identifying the same source object 7111. This identification may be provided as described in detail earlier.

The transformer 7121 is converted to a transformer 7221 using the conversion rule FIG. 6c. The target transformer object is different as illustrated by a dashed line drawn through the transformer. Accordingly, the target transformer object includes data, e.g. attributes, references to one or more other objects that have not been provided by the source transformer object. This means that the generated transformed object does not have a corresponding source object. According to the conversion rule 6c, the transformer target object may include information identifying related target objects, e.g. those of 7210, 7214, 7211 and 7231 connecting to the transformer target object.

The low voltage busbar 7131 and the low voltage feeders 7141 are converted to a single target object of a low voltage assembly station 7231 according to the conversion rule of FIG. 6a. Thus, in this example the conversion rule of FIG. 6a is applied with N>1. The target object of the low voltage assembly station now includes low voltage feeders 7241 as sub-entities. In the target data model the sub-entities may be associated to the low voltage assembly station by references between the objects. An example of references between objects is illustrated in FIG. 4, where objects of table 420 include references to table 410.

The steps/points and related functions described above in FIG. 2 are in no definite chronological order, and some of the steps/points may be performed simultaneously or in an order differing from the given one. Other functions can also be executed between the steps/points or within the steps/points, and other data, objects, signalling messages may be obtained and/or processed between the illustrated steps. Some of the steps/points or part of the steps/points can also be left out or replaced by a corresponding step/point or part of the step/point.

The techniques described herein may be implemented by various means so that an apparatus implementing one or more functions described with an embodiment comprises not only prior art means, but also means for converting source objects according to a source data model to target objects according to a target data model, means for storing with each of the target objects information identifying a source object of the target object, means for generating a plurality of target data collections, each of which includes uniquely identifiable target objects, and means for merging a first generated target data collection with a subsequently generated target data collection.

The apparatus may further comprise means for comparing a first generated data collection with a subsequently generated data collection, means for determining corresponding objects between the first generated data collection and a subsequently generated data collection, and means for updating the corresponding objects of an earlier generated data collection from the corresponding objects of a subsequently generated data collection.

More precisely, the various means comprise means for implementing functionality of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

It should be appreciated that in the described embodiments source objects may comprise various kinds of data that is used as a source to a conversion process of the source data to target data.

Although in some of the foregoing description one or more embodiments have been described involving updating corresponding objects of an earlier generated target data collection from corresponding objects of a subsequently generated target data collection, it should be appreciated that the foregoing embodiments may as well be applied to implementations, where updating corresponding objects of a subsequently generated target data collection are updated from corresponding objects of an earlier generated target data collection. Accordingly, a newest target data collection may be assigned as a master data collection that is updated from previous conversions of source objects to target objects.

It should be appreciated that in different embodiments involving comparing an earlier generated target data collection with a subsequently generated target data collection, the earlier target data collection and the subsequent target data collection may follow immediately one another in a sequence of conversions, or be obtained through conversions being separated by one or more conversions between them. Accordingly, an embodiment may involve comparing a newest generated target data collection with any previous target data collection obtained by converting source objects to target objects. This is especially suitable for converting source objects to target objects, where the newest generated target data collection is set as the master data collection.

It should be appreciated that different embodiments described above provide merging of data collections such that changes between the data collections may be updated to one of the data collections. The merged data collections are obtained by conversions of objects that follow different data models.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
    converting source objects in a first database defined according to a source data model to target objects in a second database defined according to a target data model, the source objects converted to the target objects using a set of conversion rules, said source data model and said target data model being different data models each organizing data in two-dimensional arrays;

generating a first generated target data collection and a subsequently generated target data collection, each of which includes target objects generated from the source objects;

assigning a temporary identifier to each target object in the first generated target data collection and to each target object in the subsequently generated target data collection, wherein the temporary identifiers are generated based on one or more of the source objects used to generate corresponding ones of the target objects in the first generated target data collection and corresponding ones of the target objects in the subsequently generated target data collection, each temporary identifier assigned to each target object in the first generated target data collection being different from one another, and each temporary identifier assigned to each target object in the subsequently generated target data collection being different from one another;

determining that a first temporary identifier for a first target object in the first generated target data collection matches with a second temporary identifier for a subsequent target object in the subsequently generated target data collection, wherein having matching temporary identifiers indicates that the subsequent target object is a subsequent iteration of the first target object;

in response to the determination that the first temporary identifier matches the second temporary identifier, comparing attributes of the first target object with attributes of the subsequent target object, wherein the subsequent target object is converted from the source objects according to the set of conversion rules after the first target object is converted from the source objects according to the set of conversion rules;

determining that the first target object has a different attribute than the subsequent target object; and merging the first generated target data collection with the subsequently generated target data collection by updating the attributes of the first target object to include the attributes of the subsequent target object.

2. A method according to claim 1, wherein the first generated target data collection and the subsequently generated target data collection include uniquely identifiable target objects converted from the source objects according to the set of conversion rules, said set of conversion rules defining a mapping between the source objects and the target objects, said mapping defining corresponding source objects and target objects.

3. A method according to claim 1, comprising:
updating corresponding objects of the first generated target data collection based on corresponding objects of the subsequently generated target data collection, or updating the corresponding objects of the subsequently generated target data collection based on the corresponding objects of the first generated target data collection.

4. A method according to claim 1, comprising:
determining a correspondence between the target objects of the first generated target data collection and the subsequently generated target data collection on the basis of information indicating one or more same source objects, said information being stored within the target objects.

5. A method according to claim 1, comprising:
determining a correspondence between the target objects of the first generated target data collection and the subsequently generated target data collection on the basis of one or more common attributes between the target objects.

6. A method according to claim 1, wherein corresponding objects are determined on the basis of a comparison value calculated over one or more attributes of a set of source objects and a set of target objects.

7. A method according to claim 6, wherein the comparison value comprises one or more from a group comprising: a geometric value, an electrical value and a correlation value.

8. A method according to claim 1, wherein a correspondence between objects of the first generated target data collection or the subsequently generated data collection is indicated by one or more or of a combination of items from a group comprising: an identifier of a uniquely identifiable source object, one or more attributes uniquely identifying correspondence of an object of an earlier generated target data collection and an object of a subsequently generated target data collection, and an indirect reference to a uniquely identifiable source object via one or more subsequently generated target objects.

9. A method according to claim 1, wherein a target object is specific to the target data model and without a corresponding source object, and corresponding objects between target data collections are determined by one or more common attributes.

10. A method according to claim 1, comprising:
configuring the target data model to comprise an object definition having a constraint regarding a source of data;
determining whether any of the target objects of the subsequently generated target data collections meet the constraint of the first generated target data collection; and
updating the target objects of the first generated target data collection based on the subsequently generated target data collection when the constraint is met, or updating the target objects of the subsequently generated target data collection based on the first generated target data collection when the constraint is met.

11. A method according to claim 10, wherein the object definition comprises at least two sets of attributes having different constraints regarding sources of data, whereby data is stored from the attributes of the subsequently generated target data collection to the attributes of the first generated target data collection for corresponding objects of the first generated target data collection and the subsequently generated target data collection, when the constraint of the attributes is met.

12. A method according to claim 1, wherein the second database comprises a first view having a first source of data and a second view having a second source of data.

13. A method according to claim 10, wherein a constraint regarding a source of data defines an allowed source of data, the allowed source of data comprising one or more from a group comprising: a uniquely identifiable source object, a uniquely identifiable target object of a subsequently generated target data collection, a system managing a target data collection.

14. A method according to claim 1, wherein the first generated target data collection comprises a database of a database management system, and a constraint defines the database management system allowed as a source of data.

15. A method according to claim 1, wherein the first generated target data collection comprises a database of a database management system, and the database management system of a target database is a source of data for a part of the target database and a database management system of a source database is a source of data for another part of the target database.

16. A method according to claim 1, wherein the source data model defines objects of a network comprising one of a group comprising: an electrical grid, a municipal data application and a water supply network.

17. A method according to claim 1, wherein the data collection comprises a relational database preferably accessible by a database management system comprising one from a group comprising: Oracle, MySQL, MS Access.

18. A system comprising:
a first database storing source objects and defined according to a source data model;
a second database storing target objects and defined according to a target data model, said source data model and target data model comprising different data models; and
a processor connected to the first database and the second database and configured to:
convert the source objects in the first database to the target objects according to a set of conversion rules;
generate a first generated target data collection and a subsequently generated target data collection, each of which includes target objects generated from the source objects;
assign a temporary identifier to each target object in the first generated target data collection and to each target object in the subsequently generated target data collection, wherein the temporary identifiers are generated based on one or more of the source objects used to generate corresponding ones of the target objects in the first generated target data collection and corresponding ones of the target objects in the subsequently generated target data collection, each temporary identifier assigned to each target object in the first generated target data collection being different from one another, and each temporary identifier assigned to each target object in the subsequently generated target data collection being different from one another;
determine that a first temporary identifier for a first target object in the first generated target data collection matches with a second temporary identifier for a subsequent target object in the subsequently generated target data collection, wherein having matching temporary identifiers indicates that the subsequent target object is a subsequent iteration of the first target object;
in response to the determination that the first temporary identifier matches the second temporary identifier, compare attributes of the first target object with attributes of the subsequent target object, wherein having matching temporary identifiers indicates that the subsequent target object is a subsequent iteration of the first target object, wherein the subsequent target object is converted from the source objects according to the set of conversion rules after the first target object is converted from the source objects according to the set of conversion rules;
determine that the first target object has a different attribute than the subsequent target object; and
merging the first generated target data collection with the subsequently generated target data collection by updating the attributes of the first target object to include the attributes of the subsequent target object.

19. A computer program embodied on a non-transitory computer readable storage medium, the computer program being configured to control a processor to perform a method comprising:
converting source objects in a first database defined according to a source data model to target objects in a second database defined according to a target data model, the source objects converted to the target objects using a set of conversion rules, said source data model and said target data model being different data models;
generating a first generated target data collection and a subsequently generated target data collection, each of which includes target objects generated from the source objects;
assigning a temporary identifier to each target object in the first generated target data collection and to each target object in the subsequently generated target data collection, wherein the temporary identifiers are generated based on one or more of the source objects used to generate corresponding ones of the target objects in the first generated target data collection and corresponding ones of the target objects in the subsequently generated target data collection, each temporary identifier assigned to each target object in the first generated target data collection being different from one another, and each temporary identifier assigned to each target object in the subsequently generated target data collection being different from one another;
determining that a first temporary identifier for a first target object in the first generated target data collection matches with a second temporary identifier for a subsequent target object in the subsequently generated target data collection, wherein having matching temporary identifiers indicates that the subsequent target object is a subsequent iteration of the first target object;
in response to the determination that the first temporary identifier matches the second temporary identifier, comparing attributes of the first target object with attributes of the subsequent target object, wherein the subsequent target object is converted from the source objects according to the set of conversion rules after the first target object is converted from the source objects according to the set of conversion rules;
determining that the first target object has a different attribute than the subsequent target object; and
merging the first generated target data collection with the subsequently generated target data collection by updating the attributes of the first target object to include the attributes of the subsequent target object.

* * * * *